(12) United States Patent
Sarver et al.

(10) Patent No.: US 9,756,797 B2
(45) Date of Patent: Sep. 12, 2017

(54) SYSTEM AND METHOD FOR OPTIMIZING EVAPOTRANSPIRATION BASED IRRIGATION CONTROL USING A MOISTURE SENSOR

(75) Inventors: Larry C. Sarver, Mars, PA (US); Soren Haxvig, Espergaerde (DK)

(73) Assignee: Larry C. Sarver, Mars, PA (US)

( * ) Notice: Subject to any disclaimer, the term of this patent is extended or adjusted under 35 U.S.C. 154(b) by 1010 days.

(21) Appl. No.: 13/449,789

(22) Filed: Apr. 18, 2012

(65) Prior Publication Data

US 2012/0261486 A1 Oct. 18, 2012

Related U.S. Application Data

(60) Provisional application No. 61/476,531, filed on Apr. 18, 2011.

(51) Int. Cl.
*B05B 12/08* (2006.01)
*A01G 25/16* (2006.01)

(52) U.S. Cl.
CPC .................................. *A01G 25/167* (2013.01)

(58) Field of Classification Search
CPC .................................................... A01G 25/167
USPC ........................................................ 700/284
See application file for complete search history.

(56) References Cited

U.S. PATENT DOCUMENTS

| | | | | |
|---|---|---|---|---|
| 5,097,861 A | * | 3/1992 | Hopkins et al. | 137/78.3 |
| 5,839,658 A | | 11/1998 | Sarver | |
| 2006/0184285 A1 | * | 8/2006 | Evelyn-Veere | 700/284 |

OTHER PUBLICATIONS ("Assessment of Evapotranspiration and Soil Moisture Content Across Different Scales of Observation" from "Sensors 2008, 8, 70-117").*
Richard G. Allen et al. "FAO Irrigation and Drainage Paper No. 56" (1998).*
Answers@NOAA.gov, <http://findanswers.noaa.gov/noaa.answers/consumers/kbdetail.asp?kbid=352&catID1=208, Jun. 29, 2005, 2 pages.
Burba, George et al., "Evapotranspiration",<http://www.eoearth.org/article/Evapotranspiration>, Aug. 3, 2010, 4 pages.
"Field capacity", The American Heritage Dictionary of the English language, Fourth Edition, 2009. Published by Houghton Mifflin Company. <http://www.thefreedictionary.com/field+capacity>.
Leopold, Luna et al., "The Water Cycle: Evapotranspiration", USGS Water Science for Schools, Mar. 9, 2012, 3 pages, <http://ga.water.usgs.gov/edu/watercycleevapotranspiration.html>.
"Soil Moisture Monitoring", TUCOR Inc., pp. 1-2, printed 2012.

(Continued)

*Primary Examiner* — Michael D Masinick
*Assistant Examiner* — Yuhui R Pan
(74) *Attorney, Agent, or Firm* — The Webb Law Firm

(57) ABSTRACT

In an irrigation system and method, a controller acquires data regarding soil moisture from one or more soil moisture sensors disposed in an irrigation area and determines whether to irrigate or withhold irrigation from the irrigation area based on a combination of evapotranspiration (ET) data and the acquired soil moisture data. An irrigation means is responsive to the controller determining whether to apply or withhold irrigation from the irrigation area for respectively applying or withholding irrigation from the irrigation area.

18 Claims, 14 Drawing Sheets

(56) References Cited

OTHER PUBLICATIONS

"Weather and Soil Moisture Based Landscape Irrigation Scheduling Devices", Technical Review Report—2nd Edition, Reclamation—Managing Water in the West, Aug. 2007, pp. iv-126, prepared by Southern California Area Office Temecula, California and Technical Service Center Water Resource Planning and Operations Support Group Denver, Colorado.

"Wilting point", McGraw-Hill Science & Technology Dictionary, Answers.com, Mar. 3, 2012, <http://www.answers.com/topic/wilting-point>.

Natural Resources Management and Environment Department, "Crop evapotranspiration-Guidelines for computing crop water requirements . . . " Chapter 1—Introduction to evapotranspiration, (Jan. 1998), <http://www.fao.org/dorcep/X0490E/x0490e.htm>.

\* cited by examiner

ET/MOISTURE MANAGEMENT

| PRO | ET bal | WB/ET | MOISTURE | ALLOW | PREVENT | OPTIMUM | NEXT WATER day in | NEW ET |
|---|---|---|---|---|---|---|---|---|
| 1 | 0.45 | ET | 46 | 20 | 90 | 50 | 2 | 0.0 |
| 2 | 0.23 | ET | 46 | 2 | 30 | 22 | 6 | 0.0 |
| 3 | | WB | 75 | 35 | 85 | 60 | 0 | |
| | | | | | | | | |
| 10 | | | | | | | | REFRESH |

20

| SEP sor | STAtus | MOIST % | TEMP (F) | 2" | 4" | 6" | 8" | 10" | 12" | 16" | 20" | 24" | 28" | 32" | 36" | 40" | 44" | 48" | 52" | 56" | 60" |
|---|---|---|---|---|---|---|---|---|---|---|---|---|---|---|---|---|---|---|---|---|---|
| 1 | OK | 46 | 82 | 46 | 48 | 51 | 56 | 59 | 61 | | | | | | | | | | | | |
| 2 | OK | 36 | 76 | | | | | | | | | | | | | | | | | | |
| 3 | OK | 75 | 89 | | | | | | | | | | | | | | | | | | |
| 4 | N/A | | | | | | | | | | | | | | | | | | | | |
| 10 | OK | 42 | 79 | | | | | | | | | | | | | | | | | | |

SYSTEM AND METHOD FOR OPTIMIZING EVAPOTRANSPIRATION BASED IRRIGATION CONTROL USING A MOISTURE SENSOR

CROSS REFERENCE TO RELATED APPLICATION

The present application claims priority to U.S. Provisional Patent Application No. 61/476,531, filed Apr. 18, 2011, which is incorporated herein by reference.

BACKGROUND OF THE INVENTION

Field of the Invention

The present invention relates to irrigation control and, more particularly, to a system and method for optimizing evapotranspiration (ET) irrigation control.

Description of Related Art

Currently, irrigation schedules are determined based upon evapotranspiration (ET) data or soil moisture-based monitoring. ET data is readily available, e.g., online via the Internet, from any number of state and/or federal agencies in the U.S., or academic institutions such as universities. ET data is determined from real-time data or historical data regarding an amount of water (e.g., inches) required to make up a watering deficit. In contrast, soil moisture-based monitoring relies on actual measurements of an amount of moisture in the soil at various depths.

Prior art methodologies for irrigation scheduling are discussed in *Reclamation: Managing Water in the West: Weather and Soil Moisture Based Landscape Irrigation Scheduling: Technical Review Report—2$^{nd}$ Edition,* August 2007, published by the U.S. Dept. of the Interior, Bureau of Reclamation, Lower Colorado Region, Southern California Area Office.

It is desirable to provide more accurate irrigation models to conserve water and related costs, while maximizing vegetation growth and quality.

SUMMARY OF THE INVENTION

Herein disclosed is a system and method for validating ET-based irrigation control by combining ET data with moisture-based data readings. The disclosed system and method can produce more accurate irrigation schedules than currently obtained from solely relying on ET or moisture-based data.

More specifically, disclosed is an irrigation method comprising: (a) a controller acquiring data regarding soil moisture from one or more soil moisture sensors disposed in an irrigation area; (b) the controller determining whether to irrigate or withhold irrigation from the irrigation area based on a combination of evapotranspiration (ET) data and the soil moisture data acquired in step (a); and (c) an irrigation means responsive to the controller determining whether to apply or withhold irrigation from the irrigation area in step (b) for respectively applying or withholding irrigation from the irrigation area.

The ET data of step (b) can be acquired from a memory of the controller, can be determined by the controller in real-time based on weather station data, or can be acquired from a source remote from the controller.

The source remote from the controller can be a server that is in communication with the computer. The server can be in communication with the computer via a communication network. The communication network can be comprised of a wired and/or wireless local area computer network, a wired and/or wireless wide area computer network, a combination of a wired and/or wireless local area computer network and a wired and/or wireless wide area computer network, and/or a cellular network. The communication network can be comprised of the Internet.

Step (c) can be performed daily or multiple times daily.

Step (b) can include the controller solving the following equation:

$$ETm = ETc - \frac{\alpha * (VSM - VSMnom) * ETc}{(VSMmax - VSMmin) * 1/2}$$

where ETm=moisture-corrected ET;
ETc=rain-corrected ET, i.e., ETc=ET for a predetermined interval or period of time+Rainfall amount for the predetermined interval or period of time;
VSM=actual volumetric soil moisture (determined from the data acquired by the soil moisture sensor(s));
VSMmax=the moisture of the soil in the irrigation area when said soil is at or near field capacity;
VSMmin=the moisture of the soil in the irrigation area when said soil is at or near wilting point;
VSMnom=the nominal (ideal) volumetric soil moisture (set to the median of VSMmax and VSMmin); and
$\alpha$=user-definable regulation variable between 0 and 1: 0=no regulation, 1=full regulation.

The initial value of ET can be determined from one or more of the following obtained, in real-time, from one or more weather stations or obtained from one or more historical records: air temperature; solar radiation; air humidity; and wind speed.

The value for VSM can be determined from the data regarding soil moisture acquired from a plurality of soil moisture sensors.

The predetermined interval or period of time can be a day or a portion thereof.

In response to determining to apply irrigation, the controller can cause the irrigation means to apply an amount of irrigation that is substantially equal to ET or ETm minus the amount of rain received for the predetermined interval or period of time.

The controller can include a processor operating under the control of a control program that causes the controller to solve the above equation based on the value of VSM determined from the acquired data regarding soil moisture, an acquired value of ET or a value of ET determined from a prior value of ETm and data regarding rainfall amount.

The controller can acquire the data regarding rainfall amount either via a computer network or via one or more rainfall sensor(s), desirably disposed in the irrigation area.

Also disclosed is an irrigation system comprising: a controller operating under the control of a control program; irrigation means responsive to the controller for applying moisture to an irrigation area; and one or more soil moisture sensors for sensing soil moisture in the irrigation area and for outputting data regarding said sensed soil moisture, wherein, under the control of the control program, the controller is operative for acquiring the data regarding the sensed soil moisture output by the one or more soil moisture sensors, for determining whether to irrigate or withhold irrigation from the irrigation area based on a combination of evapotranspiration (ET) data and the acquired soil moisture data, and for causing the irrigation means to apply irrigation to the irrigation area upon determining to irrigate the irrigation area.

The irrigation system can include rainfall sensor(s) operative for outputting data regarding an amount of rainfall, wherein the controller determines whether to irrigate or withhold irrigation from the irrigation area based on the data regarding the amount of rainfall.

The ET data can be programmed into a memory of the controller, can be determined by the controller in real-time based on weather station data, or can be acquired electronically by the controller via a communication network.

Still other desirable features of the invention will become apparent to those of ordinary skill in the art upon reading and understanding the following detailed description.

BRIEF DESCRIPTION OF THE DRAWINGS

FIG. 2 are graphs that can be displayed on a graphical user interface (GUI) of a human-machine interface (HMI) of the controller of the system S shown in FIG. 1;

DETAILED DESCRIPTION OF THE INVENTION

The present invention will now be described with reference to the accompanying figures.

The present invention may be utilized to indicate whether an existing evapotranspiration (ET) model is accurate. If not, a new ET model or proposed irrigation schedule may be derived.

Figure 1:
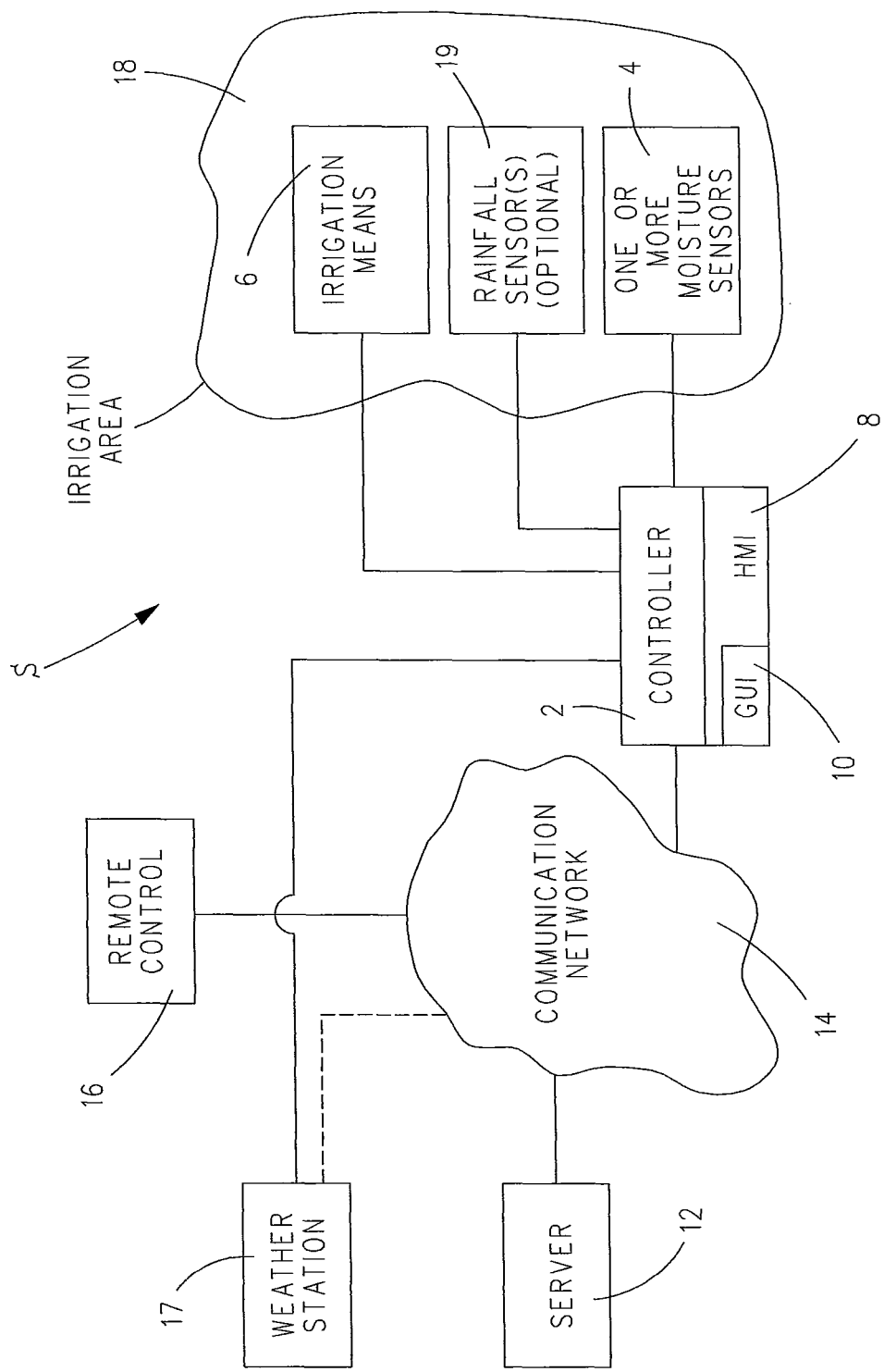
FIG. 1 is a block diagram of an irrigation control system S which can be optionally coupled to a communication network that provides communication between a controller of system S and a server, an optional weather station, and/or a remote control.

With reference to FIG. 1, disclosed is a system S for controlling irrigation of an irrigation area 18 by taking into account existing ET data and moisture-based data readings to determine if a current ET balance associated with irrigation area 18 is proper, thereby preventing over- or under-irrigation of irrigation area 18. The system S includes a controller 2, one or more moisture sensors 4, irrigation means 6 and one or more optional rainfall sensors 19. Irrigation means 6 and moisture sensor(s) 4 are desirably disposed in irrigation area 18.

Controller 2 can include a human machine interface (HMI) 8 that includes a graphical user interface (GUI) 10. HMI 8 and GUI 10 (e.g., a visual display) can be any suitable and/or desirable combination of hardware and software that enables a user to interact with controller 2 in a manner known in the art, such as, without limitation, HMI 8 and GUI 10 having touch screen capability, HMI 8 including a keyboard and a mouse and GUI 10 being a visual display, etc. In one exemplary, non-limiting embodiment, controller 2 can be a PC-class based computer having a processor, computer memory (RAM, ROM, EPROM) operating under the control of a control program which operates under the control of an operating system. However, this is not to be construed as limiting the invention since it is envisioned that any suitable and/or desirable type of controller, operating under the control of a control program, that includes suitable means for enabling a user to interact with the hardware and software (control program) thereof can be utilized.

Each moisture sensor 4 can be any suitable and/or desirable type of moisture sensor that is capable of measuring soil moisture. Non-limiting examples of suitable moisture sensors 4 for sensing soil moisture include the SMS-100 Sensor or the SMP Series Probes available from TUCOR, Inc. of Wexford, Pa. Each moisture sensor 4 may be connected to controller 2 in any suitable and/or desirable manner, such as, via a wired connection, a wireless connection, or some combination of a wired/wireless connection.

Each rain sensor 19 can be any suitable and/or desirable type of rain sensor that is capable of detecting rainfall amounts. Non-limiting examples of suitable rainfall sensors 19 for sensing rainfall amounts include the TRB series rain sensor available from TUCOR, Inc. of Wexford, Pa. Each rainfall sensor 19 may be connected to controller 2 in any suitable and/or desirable manner, such as, via a wired connection, a wireless connection, or some combination of a wired/wireless connection.

Irrigation means 6 can include any suitable and/or desirable means operable under the control of controller 2 that is capable of irrigating an irrigation area. Non-limiting examples of suitable irrigation means may include drip irrigation, spray or micro-sprinkler irrigation, bubbler irrigation, sub-irrigation, and the like. The particular type or combination of means that comprise irrigation means 6 described herein is not to be construed as limiting the invention. Each element comprising irrigation means may be connected to controller 2 in any suitable and/or desirable manner, such as, via 2-wire decoder or multi-wire conventional systems.

Controller 2 comprises hardware and software that is capable of acquiring data output by each rainfall sensor 19 and each moisture sensor 4 and for controlling irrigation means 6 in a suitable manner based upon the output of the one or more moisture sensors 4, the output of the one or more rainfall sensors 19, and ET data. The ET data can be obtained from a database that comprises historic weather conditions for the geographical region where irrigation area 18 resides. This geographical region can be any suitable and/or desirable size, such as, without limitation, a political subdivision (city, township, borough) or smaller, county, or any suitable and/or desirable geographical region. The particular size of the geographical region is, therefore, not to be construed as limiting the invention.

In one embodiment, historical ET data can be stored in a memory of controller 2 and accessible for use in determining proper levels of irrigation to be applied to (or withheld from) the irrigation area by irrigation means 6 in the manner to be described hereinafter. In another embodiment, historical ET data can be stored on a server 12 that is accessible to controller 2 via, without limitation, any suitable and/or desirable type of communication network 14, such as, a public computer network like the Internet, a private local area network, or any suitable and/or desirable combination of public and private computer networks. Hence, the location where historical ET data is stored for use by controller 2 is not to be construed as limiting the invention.

Also or alternatively, the ET data can be acquired in real-time from a weather station 17 that is connected to controller 2 in any suitable and/or desirable manner. For example, weather station 17 may be connected directly to controller 2 via a wired connection, a wireless connection, or some combination of a wired/wireless connection. Also or alternatively, weather station may be coupled to controller 2 via, without limitation, any suitable and/or desirable type of communication network 14, such as, a public computer network like the Internet, a private local area network, or any suitable and/or desirable combination of public and private computer networks. In FIG. 2, weather station 17 is illustrated as being outside of irrigation area 18. However, it is envisioned that weather station 17 may be included within irrigation area 18.

It is envisioned that controller 2 can be programmed/ controlled directly via HMI 8 and GUI 10 coupled to controller 2 or via a wired connection, a wireless connection, or some combination of a wired/wireless connection. Also or alternatively, a remote control 16 can be used to program and/or control controller 2 via communication network 14. Remote control 16 can be any suitable and/or desirable type of intelligent controller, including, without limitation, a laptop PC, a desktop PC, a smart phone, etc. Remote control 16 can communicate with communication network 14 either directly, via a wired connection, a wireless connection, or some combination of a wired/wireless connection.

It is to be appreciated that the system S shown in FIG. 1 is but one of a large number of possible configurations that can be utilized to apply irrigation to irrigation area 18 in the manner described hereinafter. For example, although a single controller 2 is shown, controller 2 can be representative of a control system wherein the acquisition and control functions described herein are distributed among a plurality of different controllers that are coupled together in any suitable and/or desirable manner, such as, directly, or via a communication network. Accordingly, the illustration of system S shown in FIG. 1 is not to be construed as limiting the invention.

With reference to FIG. 2 and with continuing reference to FIG. 1, a method of controlling the moisture in irrigation area 18 by way of the system S shown in FIG. 1 using ET data, albeit historical ET data or real-time ET data determined from data output by weather station 17, and moisture data output by the one or more moisture sensors 4 will now be described.

Various irrigation related data, including ET data and moisture-based data acquired from the one or more moisture sensors 4, may be acquired by controller 2 and displayed on GUI 10. For example, controller 2 may acquire and then display on GUI 10 the ET/moisture management spreadsheets shown in FIG. 2, wherein the top spreadsheet 20 includes a first column (Prg) indicating an irrigation program number corresponding to a certain irrigation area, the second column (ET bal) indicates the current ET balance (described hereinafter), the third column (WT/ET) indicates whether the run-time of the irrigation program is based on water budget (WB), ET, or time, the fourth column (Moisture) indicates the moisture amount determined from a soil sample; and the fifth and sixth columns (Allow and Prevent) indicate allow and prevent set point ranges for the operation of controller 2. The factors that may be used in determining the ET data can include, but are not necessarily limited to, historical or real-time wind speed, solar radiation, temperature, humidity, and rain.

The seventh column (Optimum) in top spreadsheet 20 is a target or optimum moisture associated with each program, the eighth column (Next water day in) indicates the next day that watering or irrigation via irrigation means 6 will occur based on the current schedule, and the ninth column (New ET) indicates the new ET established when ET balance (column 2) is taken into account. ET balance will be described hereinafter.

A "0" in any field of the ninth column indicates that no changes need to be made to the schedule and that the schedule is optimal based upon the current ET balance in column 2 and moisture data in column 4. By way of spreadsheet 20 shown in FIG. 2, a user of controller 2 may adjust an existing ET balance to prevent over-irrigation or under-irrigation of irrigation area 18 in view of the moisture-based data and/or other irrigation parameters. Moisture data included in each cell of column 4 of spreadsheet 20 can be the moisture data acquired by a single moisture sensor 4 or can be an average moisture value based upon readings of a plurality of moisture sensors 4 in irrigation area 18.

The bottom spreadsheet 22 in FIG. 2 includes data regarding the output of one or more moisture sensors 4 including the moisture percentage and temperature detected by each sensor.

Desirably, controller 2 adjusts ET based irrigation schedules based on moisture readings taken by one or more moisture sensors 4. Generally, based on ET data and current moisture readings taken by one or more moisture sensors 4, controller 2 is able to automatically adjust the daily value of ET, which is added to a then-current ET balance corrected for rain for each program in column 1. The principle is that high moisture readings taken by moisture sensor(s) 4 reduce(s) or lower(s) the ET balance while low moisture reading(s) increase(s) the ET balance. Thus, future ET-based irrigation can be adjusted automatically by controller 2 by monitoring soil moisture content via moisture sensor(s) 4. Stated differently, the function of the one or more moisture sensors 4 is to enable controller 2 to allow or prevent irrigation. Irrigation, however, is still controlled by water days; water budget or ET; start times, etc. To this end, the output(s) of the one or more moisture sensor(s) 4 is read by controller 2 operating under the control of a control program and is utilized as a switch for one or more programs of column 1 of top spreadsheet 20. More specifically, the output of the one or more moisture sensors 4 is detected by controller 2 operating under the control of a control program which utilizes the output of said one or more moisture sensors 4 to reduce the ET balance when high moisture is detected or to increase the ET balance when low moisture is detected. Desirably, with full regulation (discussed hereinafter) the adjusted value of ET can vary between zero and double the amount of the daily ET. This regulation can be individualized per program.

The following words will have the following meanings hereinafter.

Factor %=A user definable regulation factor between 0 and 100%. Set to 0 means no regulation. Set to 100% means full regulation. 100% regulation when wet=No ET is added to the balance 100% regulation when dry=2× the ET is added to the balance Wet=At or near field capacity Dry=At or near permanent wilt point Optimal=A desirable balance between soil and climate ET VSM=Actual volumetric soil moisture ETm=Moisture adjusted ET and corrected for rain and added to ET balance ET=ET for a prior period (e.g., the prior 24 hours)

Rain=Rain for a prior period (e.g., the prior 24 hours)
VSM ranges for different soil types are shown in the following Table 1:

TABLE 1

| Soil type | VSM (Dry) | VSM (Wet) | VSM (Optimal) |
|---|---|---|---|
| Standard | 0 | 49 | 24.5 |
| Sand | 2 | 22 | 12 |
| Loam | 6 | 36 | 21 |
| Clay | 15 | 50 | 32.5 |

Controller 2 utilizes the following equation 1 (EQ1) to determine ETm:

$$ETm = ETc - \frac{\alpha * (VSM - VSMnom) * ETc}{(VSMmax - VSMmin) * 1/2}$$

where the variables are defined as:
ETm=moisture-corrected ET; i.e. the value of ETm used for adjusting the ET balance;
ETc=rain-corrected ET, i.e., ETc=ET+Rain (for the day). The value of ET for the day can come from any source, e.g., from historical values of ET stored in a memory of controller 2 or from a remote source via communication network 14, or can be determined in real-time by controller 2 from data acquired from weather station 17;
VSM=actual volumetric soil moisture (as measured by moisture sensor(s) 4);
VSMnom=nominal (ideal) volumetric soil moisture (set to the median of VSMmax and VSMmin–(=VSM(Optimal) in Table 1))
VSMmax=maximum volumetric soil moisture (=VSM (Wet) in Table 1);
VSMmin=minimum volumetric soil moisture (=VSM (Dry) in Table 1); and
α=user-definable variable between 0 and 1; set to 0 means no regulation, set to 1 means full regulation. Note: α=Factor %/100

Figure 3:
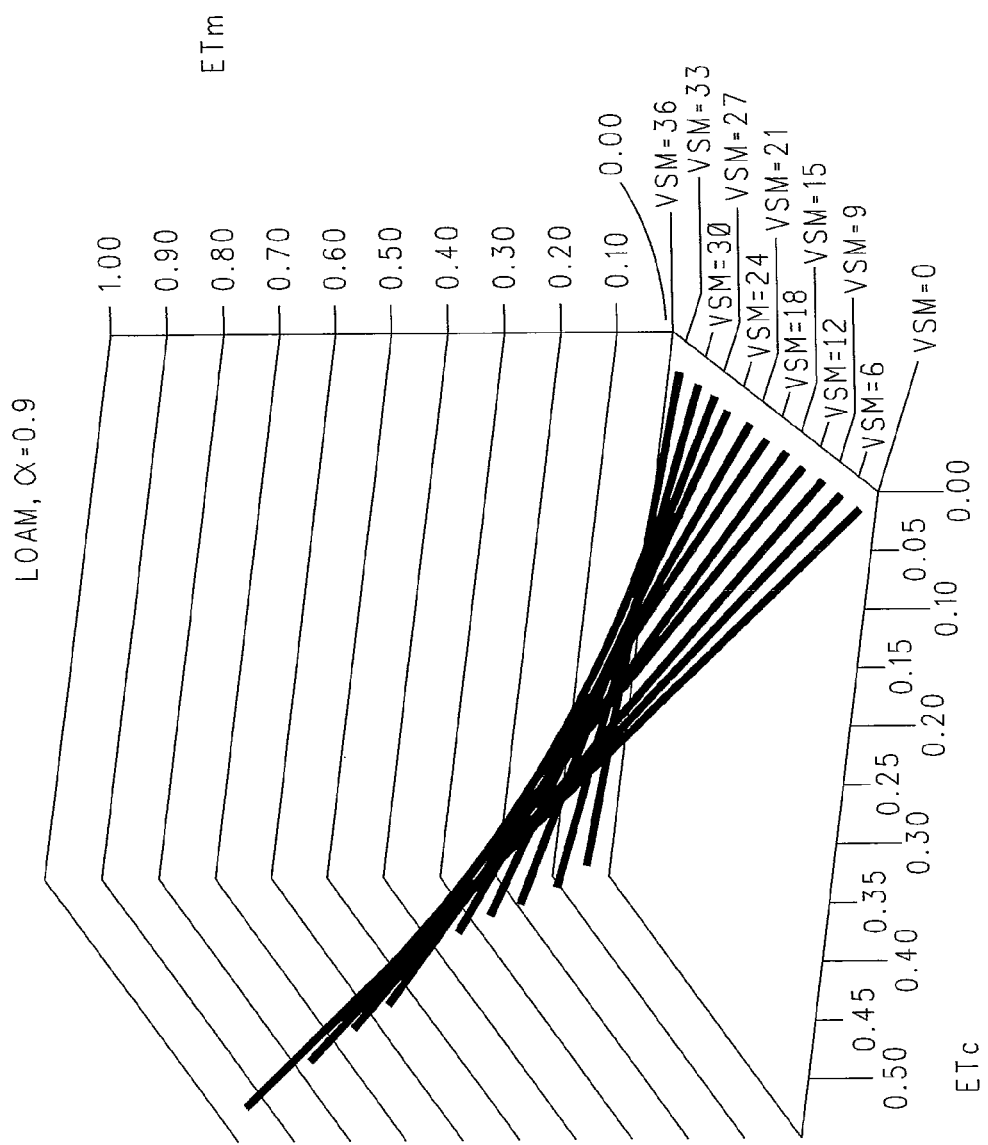
FIG. 3 is a three-dimensional graph showing how values of ETc and ETm in equation EQ1 (described herein) can vary for different values of VSM for Loam type soil and 90% regulation, i.e., $\alpha$=0.9.

Controller 2 will regulate moisture in irrigation area 18 based on the VSM ranges shown in Table 1 for soil type and the variable α. With full regulation (α=1), the value of ETm will be 0 when VSM=VSMmax. ETm=2(ETc) when VSM=VSMmin. Examples of controller 2 determining values of ETm utilizing EQ1 above for Loam soil where α=0.9 are shown in FIG. 3 for various values of ETc and VSM.

With reference to FIGS. 4-13, the following examples show the use of EQ1 by controller 2 over 15 days with various daily values of ET and Rain for dry, wet, and optimal starting soil condition and 0%, 50%, and 100% regulation. Each of the following examples has the following common conditions:
Soil type loam and root zone 4". The VSM for dry, optimal and wet soil corresponds to 0.24", 0.84", and 1.44" of water respectively.
The first irrigation period (day 7/1) begins with ET=0.20"; Rain (the current days rain)=0.00; ET balance=0.20", where ET balance=ET–Rain for the first (or starting) irrigation period (day 7/1), or ETm–Rain for each subsequent irrigation period (days 7/2-7/15).
Irrigation occurs daily if ET balance is >0.00" (no minimum/maximum ET defined).
Allow and prevent irrigation based on the moisture not used.

The water applied by irrigation and rain reach the root zone the same day.

TABLE 2

| Factor % | VSM % | ET | ETm |
|---|---|---|---|
| 0 | 6 (dry) | 0.15 | 0.30 |
| 50 | 21 (optimal) | 0.15 | 0.15 |
| 100 | 36 (wet) | 0.15 | 0.00 |
| 0 | 6 (dry) | 0.20 | 0.40 |
| 50 | 21 (optimal) | 0.20 | 0.20 |
| 100 | 36 (wet) | 0.20 | 0.00 |
| 0 | 6 (dry) | 0.25 | 0.50 |
| 50 | 21 (optimal) | 0.25 | 0.25 |
| 100 | 36 (wet) | 0.25 | 0.00 |

Figure 4:
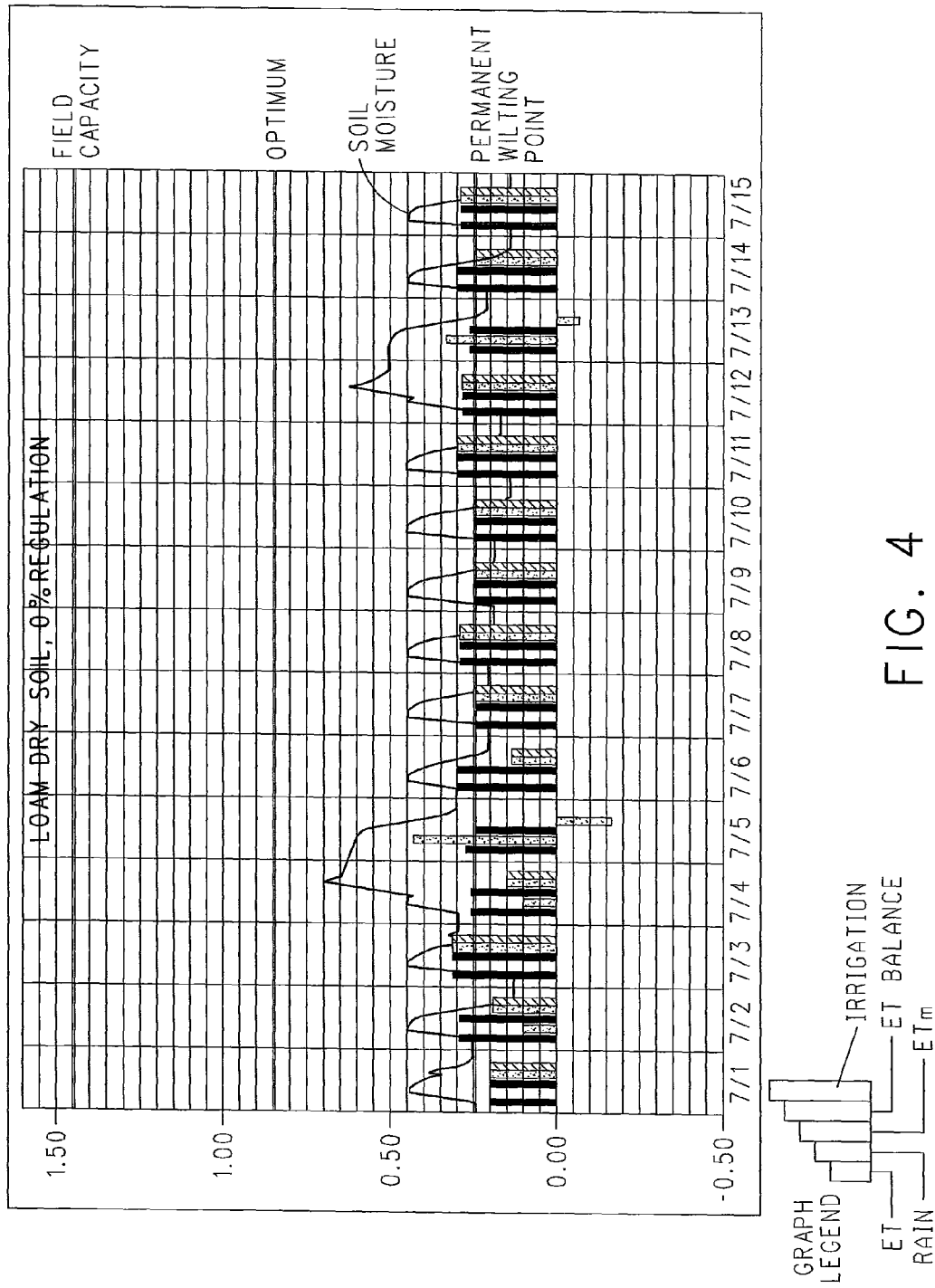
FIGS. 4-13 are spreadsheets showing the use of equation EQ1 (described herein) by the controller shown in FIG. 1 to adjust the soil moisture of Loam soil for different percent regulations, wherein FIGS. 4-6 have first starting conditions, FIGS. 7-9 have second starting conditions, FIGS. 10-12 have third starting conditions, and FIG. 13 incorporates allow and prevent irrigation limits.

In FIGS. 4-13, the meaning of each bar (or the lack thereof) for each day is shown in the graph legend at the bottom of each figure. Note that the graph legend for each of FIGS. 4-13 is the same. In the graph for each day, the five bars (or lack thereof) from left to right mean ET (for the previous period (e.g., day) determined from real-time or historical data), rain (for the previous period), ETm (determined for the current day), ET balance (determined for the current day), and Irrigation (determined for the current day), respectively. Note that for some days, one or more bars are missing. For example, in FIG. 4 day 7/1, the Rain bar is absent meaning there was no rain the previous period (day). In FIG. 4 day 7/5, the Irrigation bar is missing, meaning there was no irrigation on this day. Accordingly, the lack of one or more bars on a particular day is intended and is not to be construed as an omission.

Referring now to FIG. 4, in this example of controller's 2 use of equation EQ1, the soil moisture (VSM) measured via moisture sensor(s) 4 on day 7/1 starts at 0.24 inches, which is a dry start condition for Loam soil (stress point), ET (for the previous day) is =0.20", no Rainfall (on the previous day) and there is 0% regulation. Because the Loam soil is dry and there is no regulation, ETm=ET for day 7/1. For each day illustrated in FIG. 4, ET balance=ETm–Rain. As shown for day 7/5, there is no irrigation because the ET balance is negative. Controller 2 utilizing EQ1 starting with dry soil and 0% regulation (α=0.0) results in the soil remaining below optimal as shown by the line for soil moisture in FIG. 4.

In each of the examples described herein, the soil moisture (VSM) utilized by controller 2 is acquired from the one or more moisture sensors 4 and the irrigation is provided by irrigation means 6 under the control of controller 2. In the use of equation EQ1 in each of the examples described herein, the values of VSMnom, VSMmax, and VSMmin correspond to the values of VSM(Optimal), VSM(Wet), and VSM(Dry) shown in Table 1 for the particular soil type under investigation. For each of the examples herein, the starting value of ET is 0.20". However, this is not to be construed as limiting the invention.

Figure 5:
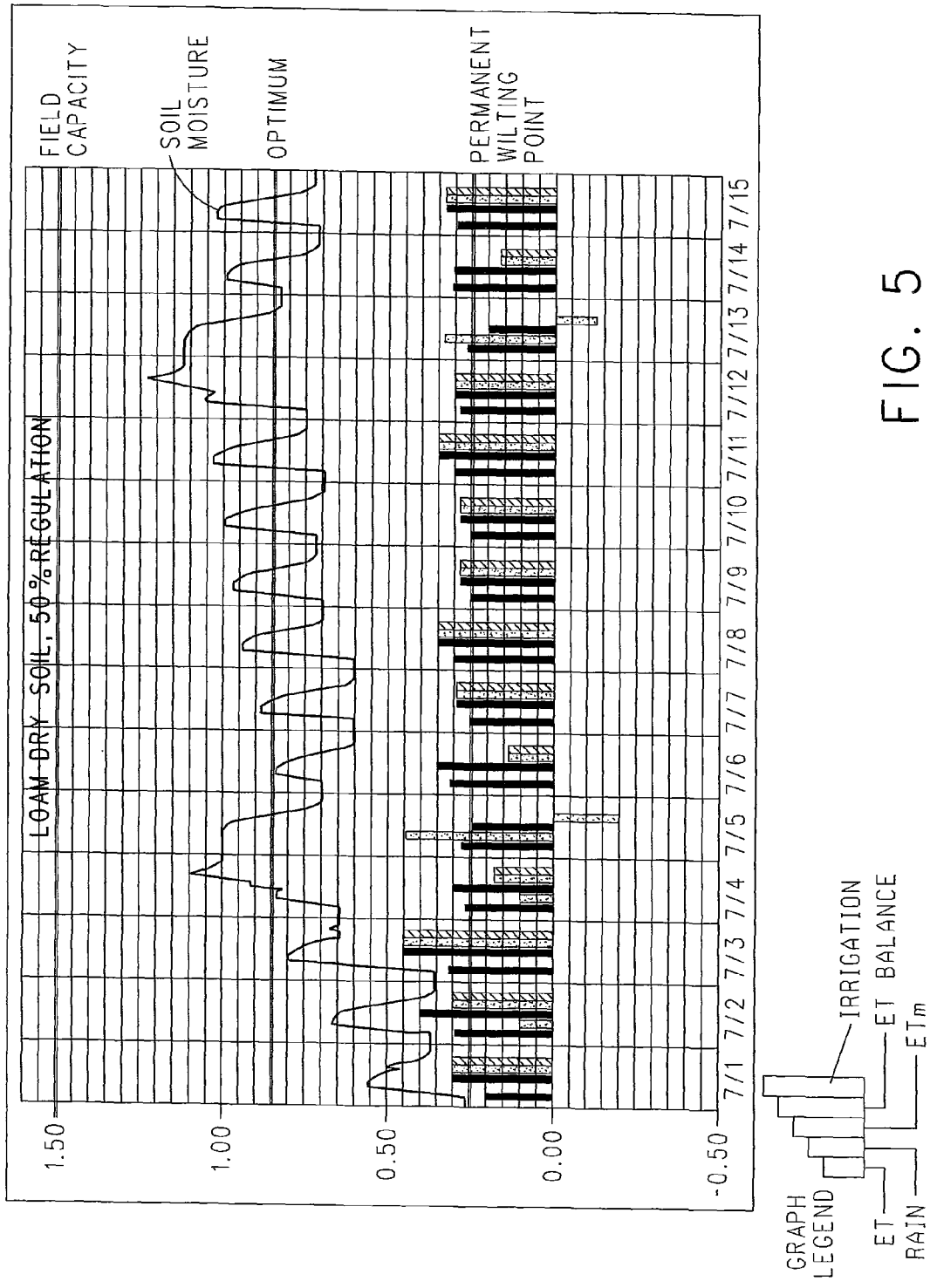

With reference to FIG. 5 and with continuing reference to FIG. 4, in the example shown in FIG. 5, except for the regulation being set at 50% (α=0.5), the example of FIG. 5 is the same as the example of FIG. 4. In the example of FIG. 5, the starting conditions for day 7/1 are: ET (for the previous day)=0.20"; no Rain (on the previous day) on day 7/1, dry Loam soil, and 50% regulation. Based on EQ1 above, the value of ETm will be regulated by up to 50% from the value of ET on day 7/1. As the soil moisture reaches optimum, ETm is regulated less. The trend shown in FIG. 4 is that soil moisture is increasing. Comparing FIGS. 4 and 5, it can be seen that in FIG. 5, controller 2 applies more irrigation on days 7/1-7/3 than for comparable days in FIG. 4 for 0% regulation. Hence, as can be seen in FIG. 5, utilizing equation EQ1 with 50% regulation, controller 2 operates to increase the soil moisture early in the fifteen-day cycle. Once the soil moisture is at or near optimum, controller 2 operating in accordance with EQ1 and 50% regulation scales back the amount of irrigation to maintain soil moisture around optimum.

Figure 6:
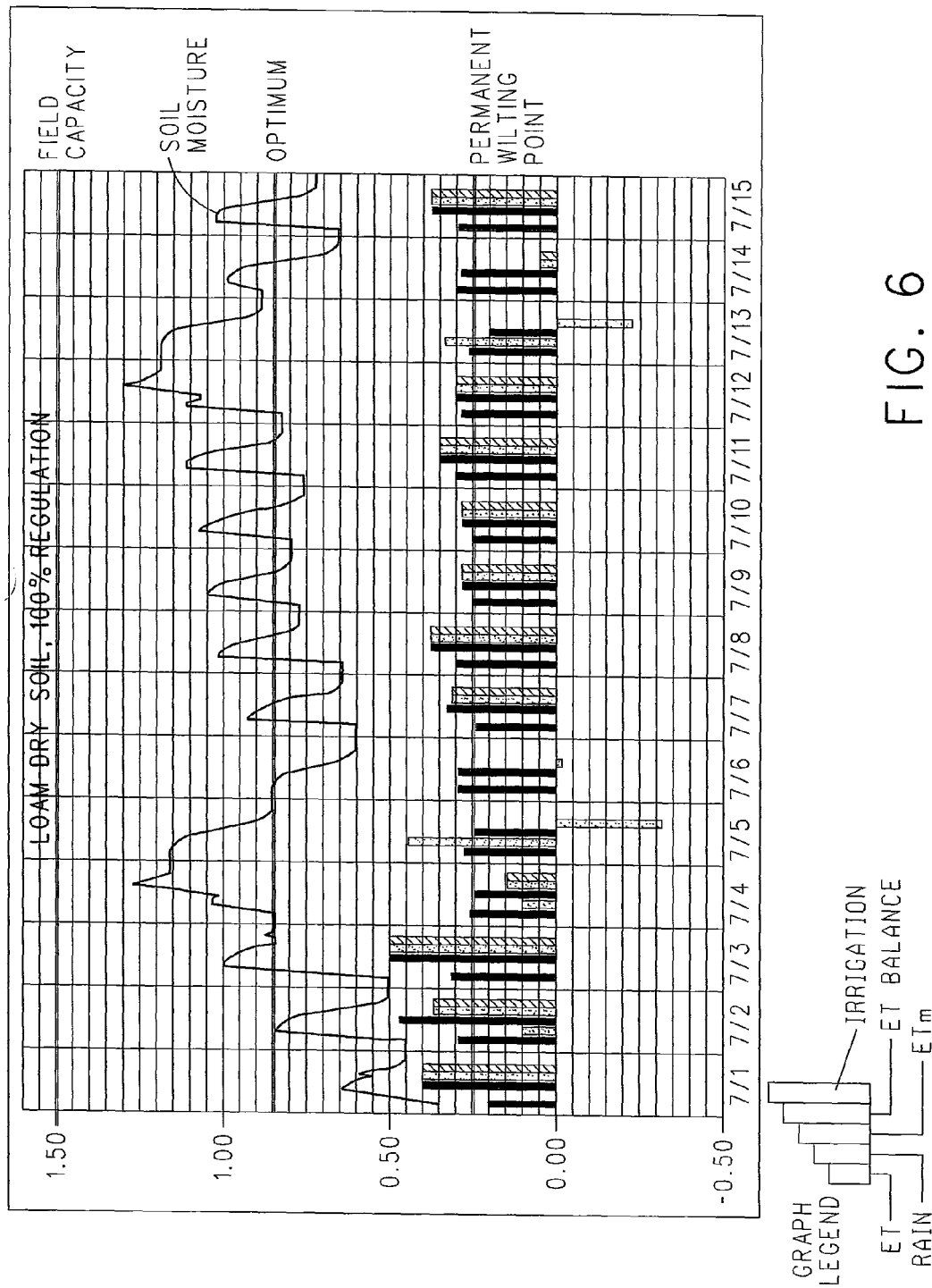

FIG. 6 is an example of the same conditions as the examples of FIGS. 4 and 5 but with 100% regulation ($\alpha=1.0$). Comparing FIG. 6 to FIG. 5 it can be seen that the soil moisture in FIG. 6 has the same tendency as the soil moisture in FIG. 5 for 50% regulation, just that the regulation of soil moisture is more aggressive on days 7/1-7/3 with 100% regulation.

Figure 7:
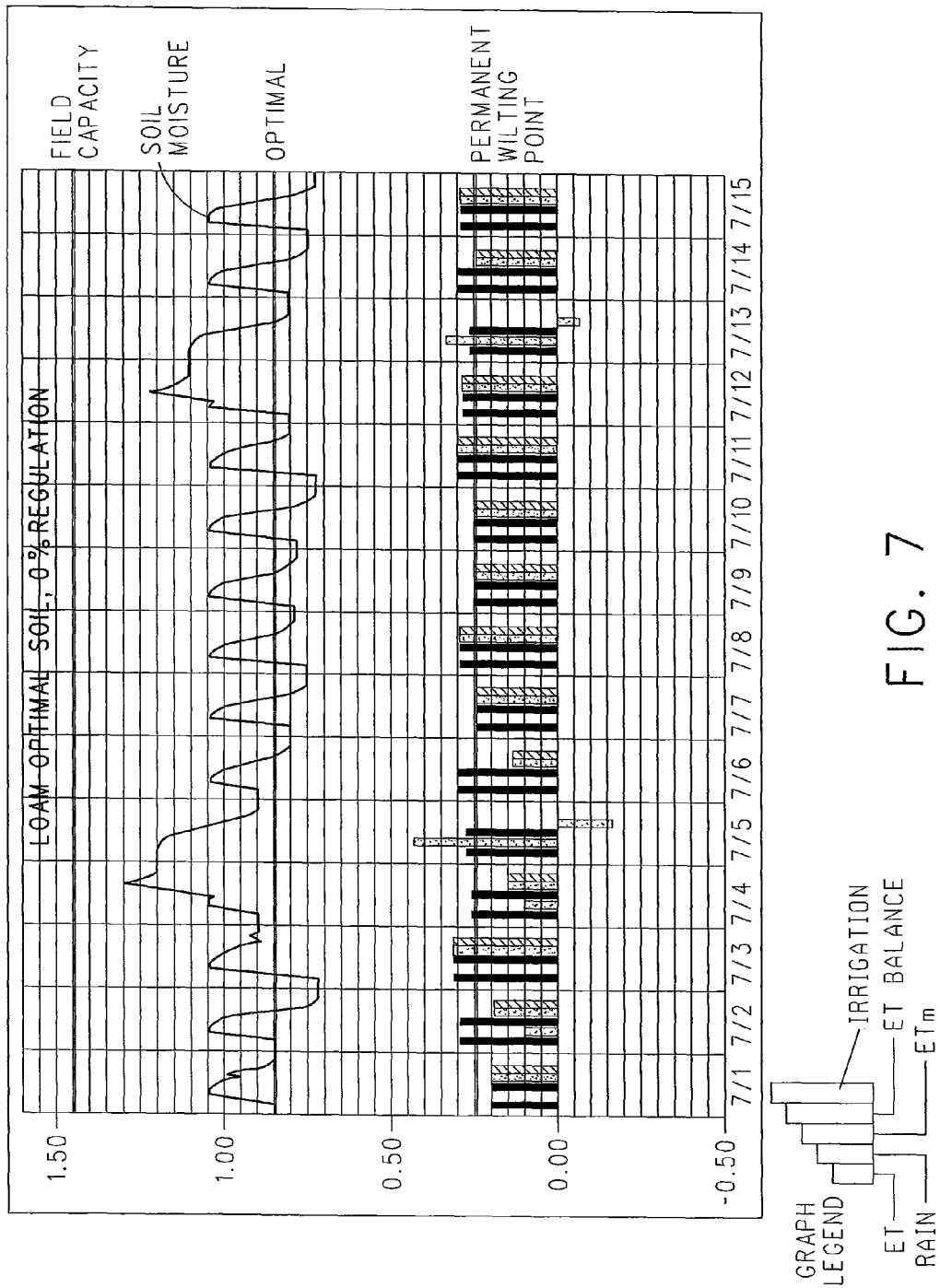

Referring now to FIG. 7, the use of EQ1 by controller 2 under the starting condition that the moisture soil (VSM) is 0.84" (a desirable or optimal starting condition) and 0% regulation ($\alpha=0.0$) shows that the soil moisture started in balance and controller 2 utilizing EQ1 and 0% regulation maintains the soil moisture in balance throughout the fifteen-day period shown in the figure.

Figure 8:
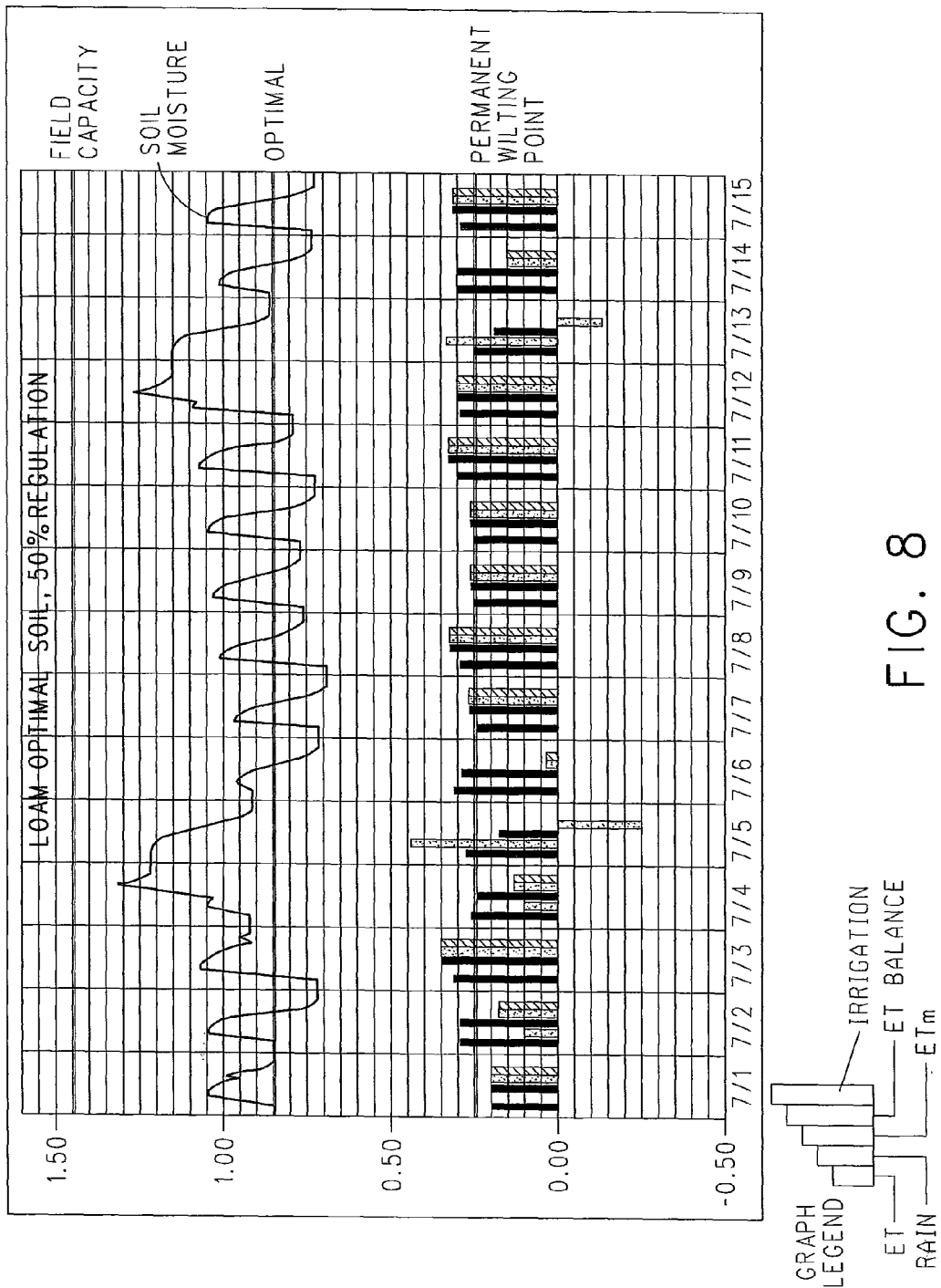
Figure 9:
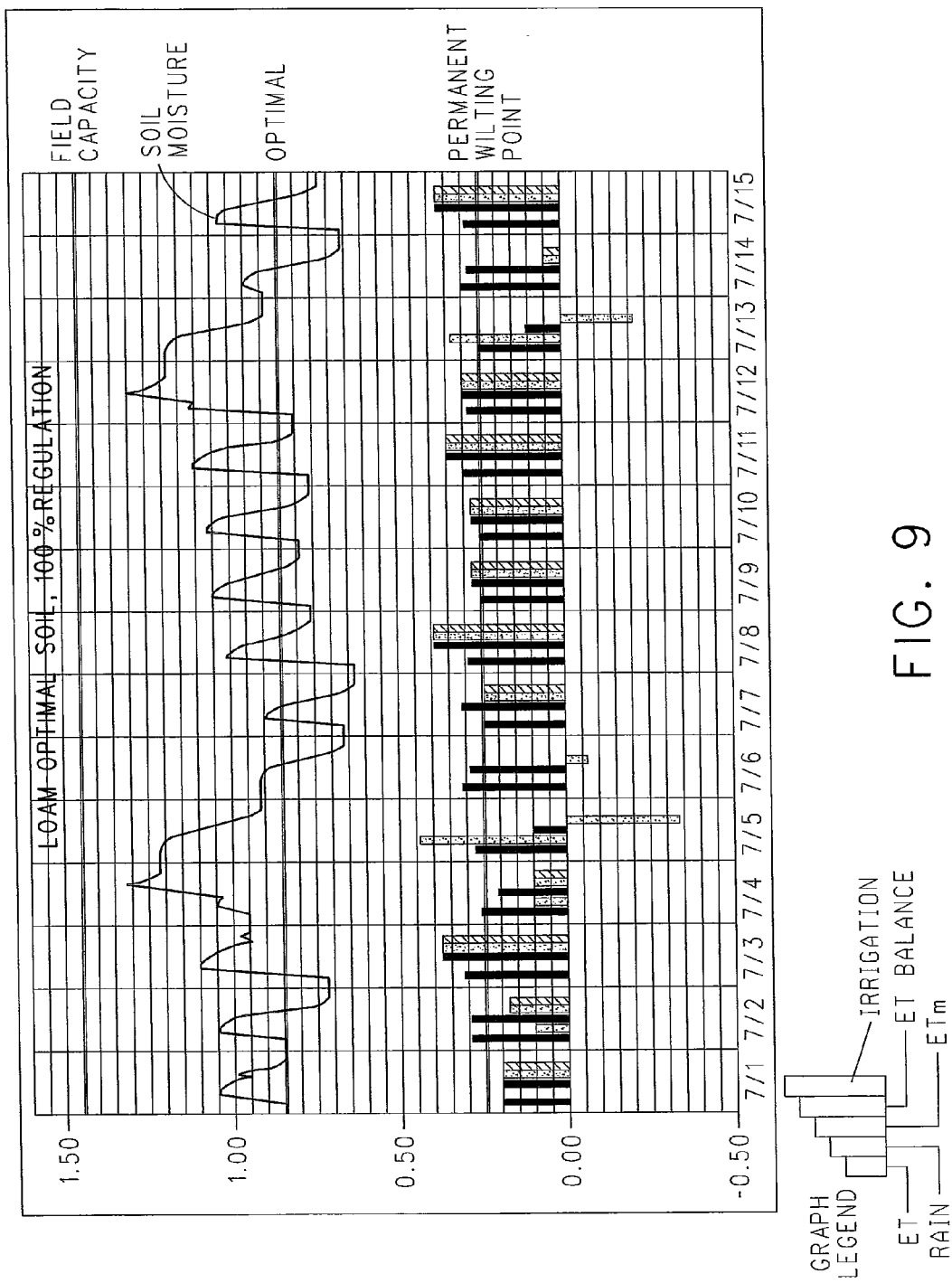

FIG. 8 has the same starting conditions as FIG. 7 but with a 50% regulation ($\alpha=0.5$). As can be seen by comparing FIGS. 7 and 8, the change between 0% regulation and 50% regulation has little influence because the soil moisture is already in balance (optimal) on day 7/1 and there are only slight deviations from the nominal or optimal value. Similar comments apply in respect of FIG. 9 for 100% regulation ($\alpha=1.0$) as for FIG. 8 at 50% regulation.

Figure 10:
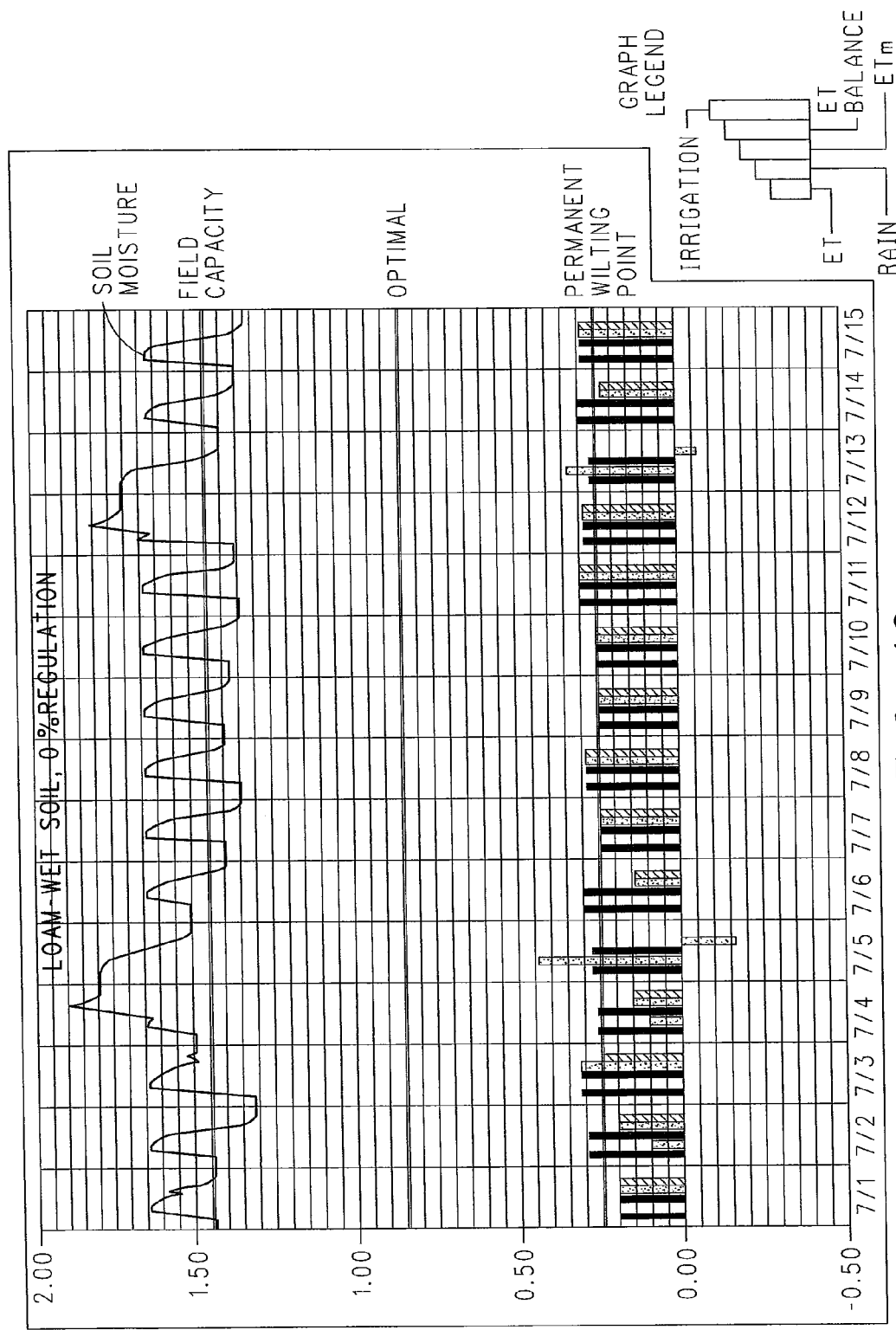

With reference to FIG. 10, the use of equation EQ1 by controller 2 under wet starting conditions (full capacity), with soil moisture (VSM) starting at 1.44 inches is explored.

In this example, the starting value of ET=0.20", there was no rain the prior day, the Loam soil is wet, and there is 0% regulation ($\alpha=0.0$). Thus, from EQ1, ETm=ET on day 7/1, where ETc=ET–Rain. Everyday after day 7/1, ET balance=ETm (or ET)–Rain. As shown in FIG. 10, there is no irrigation on day 7/5 since the ET balance is negative. Hence, in the example shown in FIG. 10 the soil is wet on day 7/1 and remains wet for the fifteen-day period shown.

Figure 11:
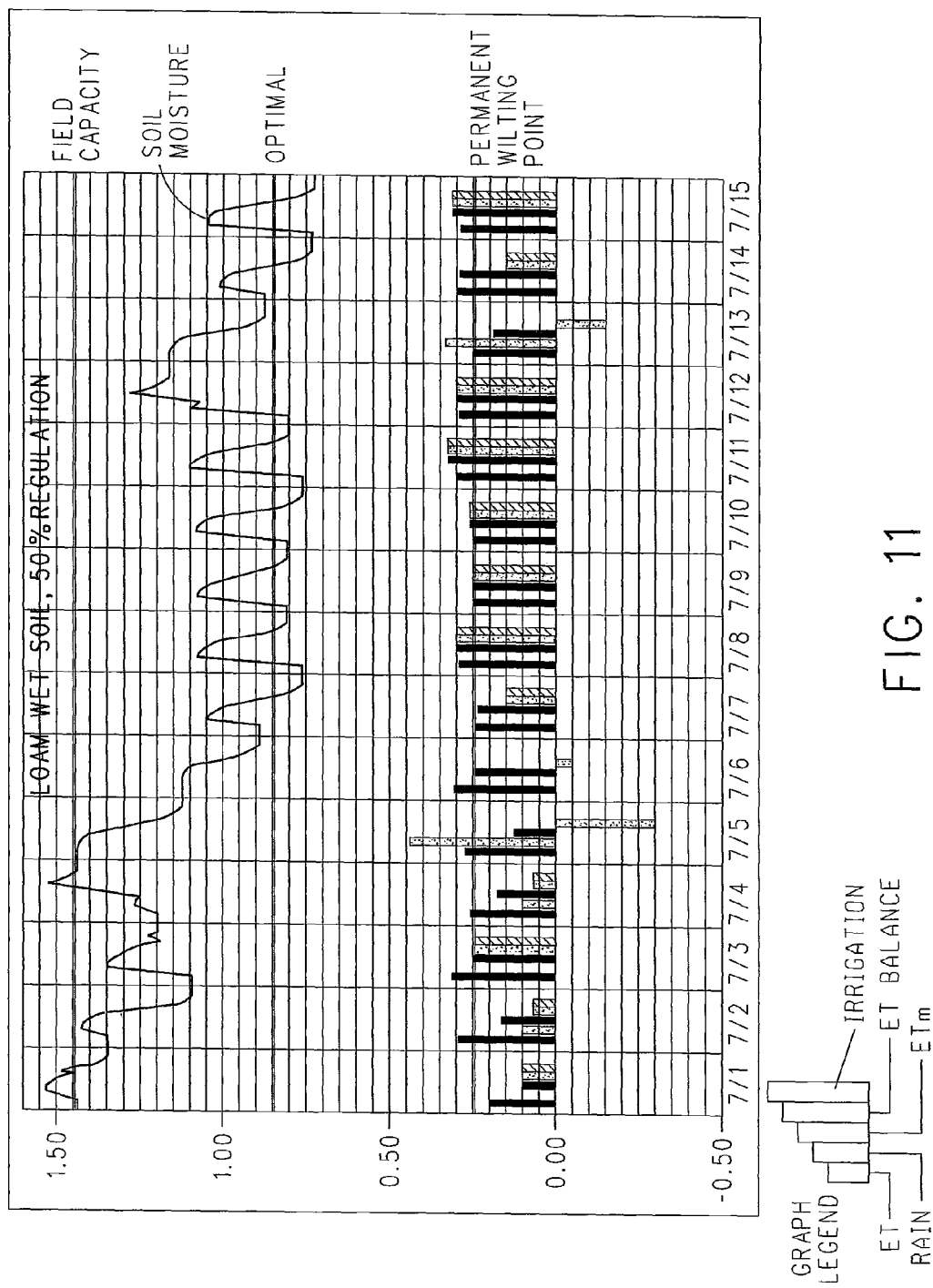

FIG. 11 illustrates the use of EQ1 for the same starting conditions as FIG. 10 except with 50% regulation ($\alpha=0.5$). As can be seen, with 50% regulation the soil dries toward optimal over time, e.g., from days 7/1-7/7. While there is still irrigation on days 7/1-7/4 and 7/7, the value of ETm for days 7/1-7/7 is less than the value of ET for each day. As shown in FIG. 11, controller 2 operating under the control of EQ1 prevents irrigation above a certain level thereby avoiding irrigation when the soil is very wet.

Figure 12:
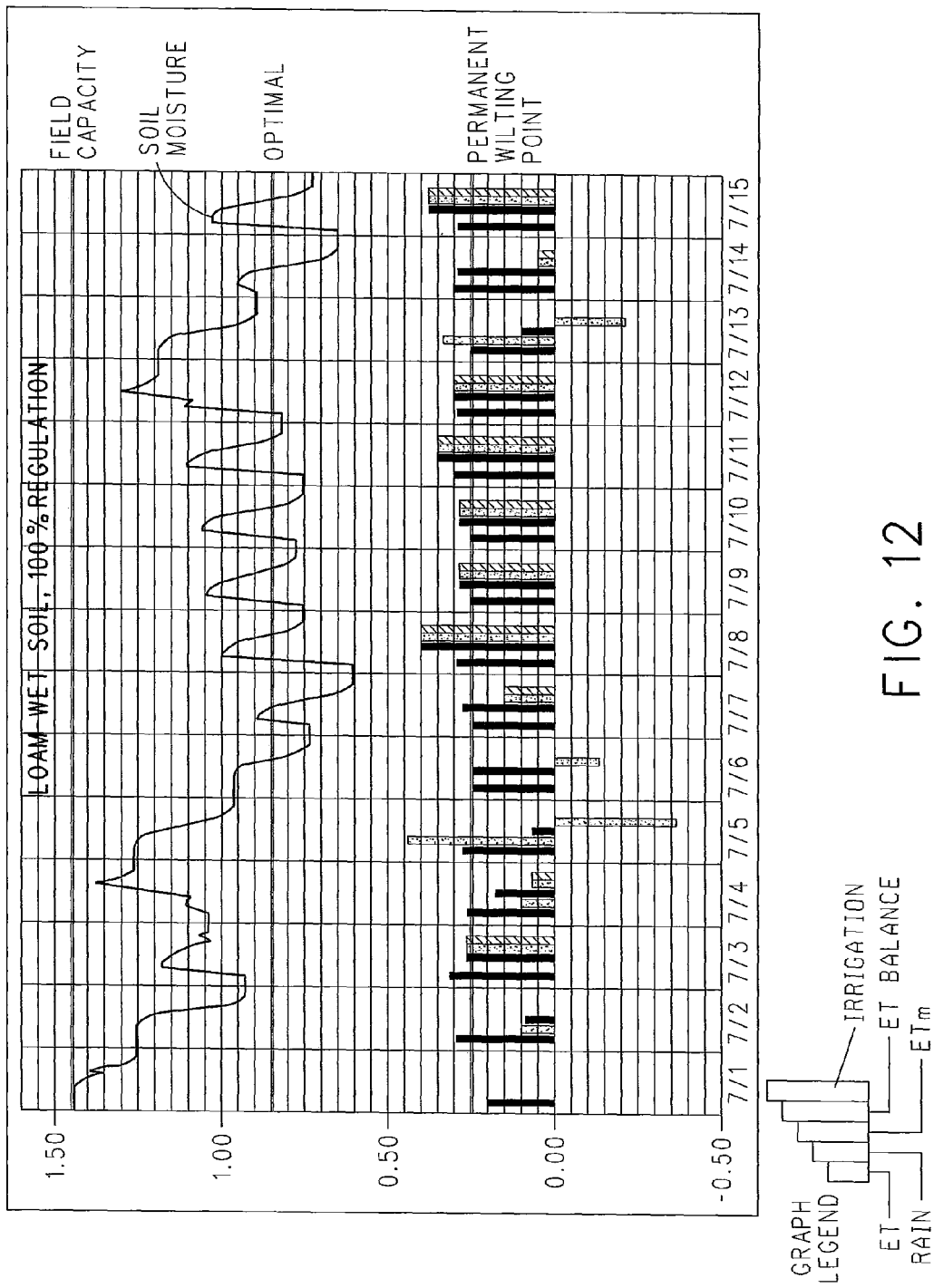

FIG. 12 has the same starting conditions as FIGS. 10 and 11 except that controller 2 utilizes 100% regulation ($\alpha=1.0$). Comparing FIGS. 11 and 12, it can be seen that 50% regulation and 100% regulation have the same general effect, with 100% regulation progressing towards the nominal value approximately one-day sooner than 50% regulation.

Figure 13:
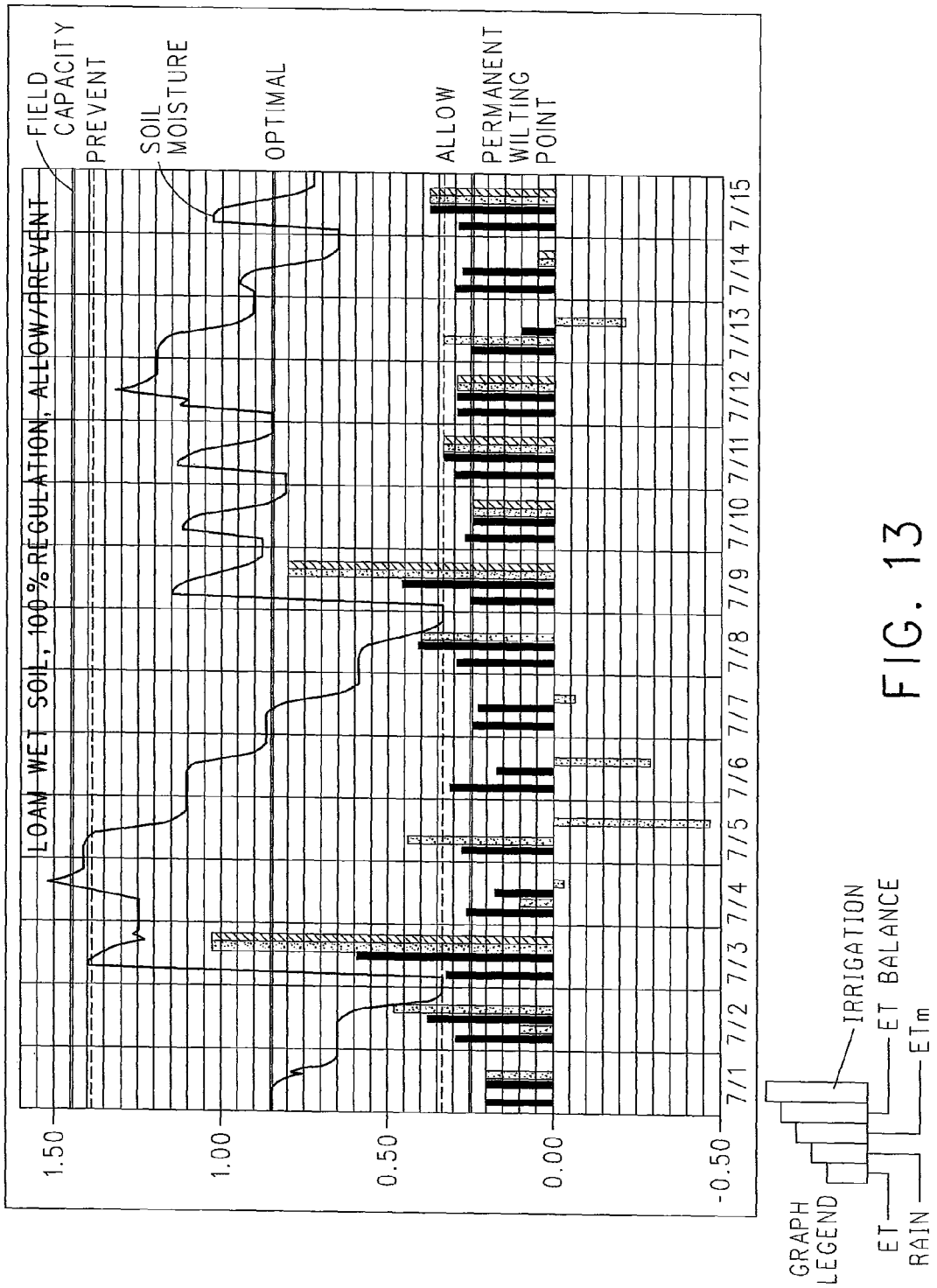

With reference to FIG. 13, the use of the allow and prevent set point values is shown. In this example, the allow set point (allow irrigation) is set to 0.34" and the prevent set point (prevent irrigation) is set to 1.34". Thus, irrigation is prevented until soil moisture drops below 0.34" and irrigation is terminated when soil moisture increases above 1.34" and remains terminated until soil moisture drops below 0.34".

Starting from the optimal soil moisture on day 7/1 again the soil moisture decreases to the point where the soil moisture drops below 0.34 inches on day 7/2. At this point on day 7/2, the ET balance is large and the first few days thereafter (days 7/3-7/4), controller 2 executing EQ1 causes the irrigation to increase the soil moisture to above the prevent set point value, i.e., 1.34" in this example. Thereafter, during the next four days (days 7/5-7/8) controller 2 operating under the control of EQ1 causes the soil moisture to drop, until the soil moisture level returns to the allow irrigation set point value whereupon controller 2 again commences irrigating irrigation area 18. Beginning on day 7/9, controller 2 operating in accordance with EQ1 does not increase the soil moisture above the prevent irrigation value and settles around optimum value. The example shown in FIG. 13 is for 100% regulation ($\alpha=1.0$).

Figure 14:
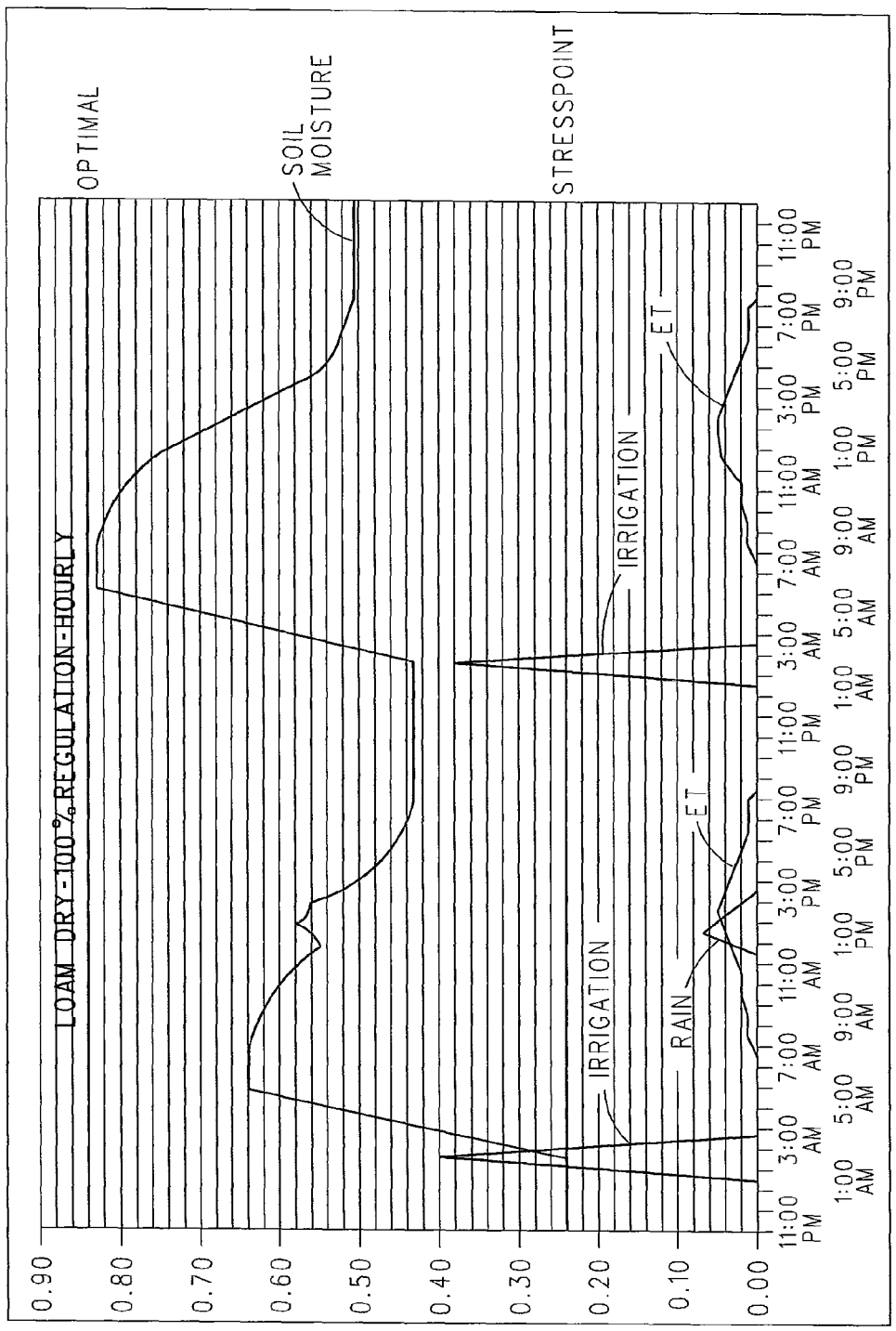
FIG. 14 is a graph illustrating the control of soil moisture of Loam soil by the controller of FIG. 1 utilizing EQ1 (described herein), hour-by-hour, over a two-day period.

With reference to FIG. 14, an example of controller 2 utilizing equation EQ1 on an hour-by-hour basis over a two-day period with 100% regulation is illustrated. As can be seen in FIG. 14, the soil is initially dry for the first two hours between 12 midnight and 1:30 a.m. on day 1. In response to irrigation between approximately 1:30 a.m. and 3:30 a.m. on day 1, the soil moisture initially increases and then begins decreasing starting about 7 a.m. in response to increasing ET caused by the sun rising. In response to rain between approximately 12:30 a.m. and 2:30 p.m. on day 1, the soil moisture increases and then begins decreasing, again in response to ET. The effect of ET on the soil moisture essentially returns to 0 about 8:30 p.m. on day 1, i.e., when the sun goes down and the effects of the sun on the value of ET ceases for the day. In this example, ET is determined from real-time data.

Referring now to day 2 in FIG. 14, in response to irrigation between 1:30 a.m. and 3:30 a.m. on day 2, the soil moisture increases and remains constant between about 5 a.m. and 7:30 a.m. when the value of ET begins increasing in response to the sun rising. The value of ET rises from 7:30 a.m. until approximately 12 noon where the value of ET decreases until approximately 8:30 when the sun goes down. During the period between 7:30 a.m. and 8:30 p.m. on day 2, the soil moisture decreases in response to the effect of ET on said soil moisture. After 8:30 p.m. on day 2, the soil moisture remains constant in response to the lack of sun and, hence, the value of ET remains at or close to 0.

In the foregoing examples, controller 2 operating in accordance with EQ1 controlled irrigation once per day (the examples of FIGS. 4-13) or hourly (the example of FIG. 14). However, this is not to be construed as limiting the examples since controller 2 can be programmed to control irrigation based on any suitable and/or desirable period of time. Accordingly, controller 2 operating in accordance with EQ1 for controlling irrigation on a daily or hourly basis is not to be construed as limiting the invention.

The present invention has been described with reference to a desirable embodiment. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:
1. An irrigation method comprising:
(a) a controller acquiring data regarding soil moisture from one or more soil moisture sensors disposed in an irrigation area, wherein the controller adjusts evapotranspiration (ET) data based on the soil moisture data;

(b) the controller determining whether to irrigate or withhold irrigation from the irrigation area based on a combination of the ET data and the soil moisture data acquired in step (a); and (c) an irrigation means responsive to the controller determining whether to apply or withhold irrigation from the irrigation area in step (b) for respectively applying or withholding irrigation from the irrigation area, wherein step (b) includes the controller solving the following equation EQ1:

$$ETm = ETc - \frac{\alpha * (VSM - VSMnom) * ETc}{(VSMmax - VSMmin) * 1/2}$$

where ETm=moisture-corrected ET;

ETc=rain-corrected ET, and ETc=ET for a predetermined interval or period of time+Rainfall amount received for the predetermined interval or period of time;

VSM=actual volumetric soil moisture, wherein the actual volumetric soil moisture is determined based on the data regarding soil moisture from the one or more soil moisture sensors;

VSMmax=moisture of the soil in the irrigation area when said soil is at or near field capacity;

VSMmin=moisture of the soil in the irrigation area when said soil is at or near wilting point;

VSMnom=nominal or ideal volumetric soil moisture; and

α=user-definable regulation variable between 0 and 1: 0=no regulation, 1=full regulation.

2. The method of claim 1, wherein the ET data of step (b) is acquired from a memory of the controller, is determined by the controller, or is acquired from a source remote from the controller.

3. The method of claim 2, wherein the source remote from the computer is a server that is in communication with the controller.

4. The method of claim 3, wherein the server is in communication with the controller via a communication network.

5. The method of claim 3, wherein the communication network is comprised of a wired and/or wireless local area network, a wired and/or wireless wide area network, a combination of a wired and/or wireless local area network and a wired and/or wireless wide area network, or a cellular network.

6. The method of claim 3, wherein the communication network is comprised of the Internet.

7. The method of claim 1, wherein step (c) is performed daily or multiple times daily.

8. The method of claim 1, wherein ET is determined from one or more of the following obtained from one or more weather stations or one or more historical records: air temperature; solar radiation; air humidity; and wind speed.

9. The method of claim 1, wherein VSM is determined from the data regarding soil moisture acquired from a plurality of soil moisture sensors.

10. The method of claim 1, wherein the predetermined interval or period of time is a day or a portion thereof.

11. The method of claim 1, wherein in response to determining to apply irrigation, the controller causes the irrigation means to apply an amount of irrigation that is substantially equal to ET or ETm minus the rainfall amount received for the predetermined interval or period of time.

12. The method of claim 1, wherein the controller includes a processor operating under the control of a control program that causes the controller to solve EQ1 based on the value of VSM determined from the acquired data regarding soil moisture, a value of ET and a rainfall amount.

13. The method of claim 1, wherein the controller acquires the rainfall amount either via a computer network or via at least one rainfall sensor.

14. The method of claim 1, wherein the controller automatically adjusts a future ET-based irrigation schedule based on the soil moisture data.

15. An irrigation system comprising:

a controller operating under the control of a control program;

irrigation means responsive to the controller for applying or withholding moisture from an irrigation area; and one or more soil moisture sensors for sensing soil moisture in the irrigation area and for outputting data regarding said sensed soil moisture, wherein, under the control of the control program, the controller is operative for acquiring the data regarding the sensed soil moisture output by the one or more soil moisture sensors, for adjusting evapotranspiration (ET) data based on the acquired soil moisture data, for determining whether to irrigate or withhold irrigation from the irrigation area based on a combination of the ET data and the acquired soil moisture data, and for causing the irrigation means to apply irrigation to the irrigation area upon determining to irrigate the irrigation area, wherein the controller determines whether to irrigate or withhold irrigation from the irrigation area by solving the following equation EQ1:

$$ETm = ETc - \frac{\alpha * (VSM - VSMnom) * ETc}{(VSMmax - VSMmin) * 1/2}$$

where ETm=moisture-corrected ET;

ETc=rain-corrected ET, and ETc=ET for a predetermined interval or period of time+Rainfall amount received for the predetermined interval or period of time;

VSM=actual volumetric soil moisture, wherein the actual volumetric soil moisture is determined based on the data regarding soil moisture from the one or more soil moisture sensors;

VSMmax=moisture of the soil in the irrigation area when said soil is at or near field capacity;

VSMmin=moisture of the soil in the irrigation area when said soil is at or near wilting point;

VSMnom=nominal or ideal volumetric soil moisture; and

α=user-definable regulation variable between 0 and 1: 0=no regulation, 1=full regulation.

16. The irrigation system of claim 15, further including at least one rainfall sensor operative for outputting data regarding an amount of rainfall, wherein the controller determines whether to irrigate or withhold irrigation from the irrigation area based on the data regarding the amount of rainfall.

17. The irrigation system of claim 15, wherein the ET data is programmed into a memory of the controller, is determined by the controller, in real-time based on weather station data, or is acquired electronically by the controller via a communication network.

18. An irrigation method comprising:
(a) a controller acquiring data regarding soil moisture from one or more soil moisture sensors disposed in an irrigation area;
(b) the controller determining whether to irrigate or withhold irrigation from the irrigation area based on a combination of evapotranspiration (ET) data and the soil moisture data acquired in step (a); and
(c) an irrigation means responsive to the controller determining whether to apply or withhold irrigation from the irrigation area in step (b) for respectively applying or withholding irrigation from the irrigation area,
wherein step (b) includes the controller solving the following equation EQ1;

$$ETm = ETc - \frac{\alpha*(VSM - VSMnom)*ETc}{(VSMmax - VSMmin)*1/2}$$

where ETm=moisture-corrected ET;

ETc=rain-corrected ET, and ETc=ET for a predetermined interval or period of time+Rainfall amount received for the predetermined interval or period of time;

VSM=actual volumetric soil moisture, wherein the actual volumetric soil moisture is determined based on the data regarding soil moisture from the one or more soil moisture sensors;

VSMmax=moisture of the soil in the irrigation area when said soil is at or near field capacity;

VSMmin=moisture of the soil in the irrigation area when said soil is at or near wilting point;

VSMnom=nominal or ideal volumetric soil moisture; and $\alpha$=user-definable regulation variable between 0 and 1:
0=no regulation,
1=full regulation.

* * * * *